(12) United States Patent
Blazer et al.

(10) Patent No.: US 7,397,992 B1
(45) Date of Patent: Jul. 8, 2008

(54) TUBELESS FIBER OPTIC CABLES HAVING STRENGTH MEMBERS AND METHODS THEREFOR

(75) Inventors: Bradley Jerome Blazer, Granite Falls, NC (US); Rodney Maurice Burns, Conover, NC (US); Julian Latelle Greenwood, III, Hickory, NC (US); Douglas Scott Hedrick, Connelly Springs, NC (US); Kenneth Darrell Temple, Jr., Newton, NC (US); Wilson Sidney Whisnant, III, Morganton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/799,004

(22) Filed: Apr. 30, 2007

(51) Int. Cl.
*G02B 6/44* (2006.01)
(52) U.S. Cl. .................. 385/106; 385/107; 385/114
(58) Field of Classification Search .......... 385/100, 385/109
See application file for complete search history.

(56) References Cited

U.S. PATENT DOCUMENTS

2006/0133746 A1* 6/2006 Quinn et al. ............. 385/100

* cited by examiner

*Primary Examiner*—Hemang Sanghavi
*Assistant Examiner*—Kajli Prince
(74) *Attorney, Agent, or Firm*—Michael E. Carroll, Jr.

(57) ABSTRACT

Disclosed are tubeless fiber optic cables having strength members, methods of making the cables, and methods for making strength members. Specifically, the concepts of the invention inhibit the distortion and/or influence the cross-sectional shape of the tubeless fiber optic cables due to torsional forces from the strength members. For instance, one tubeless fiber optic cable of the invention uses strength members with a dead-lay construction for inhibiting distortion of the same. Another tubeless fiber optic cable design uses strength members on opposite sides of the cavity where the torsional forces from the strength members are in opposite directions for influencing the cross-sectional shape of the same. Other aspects of the invention are directed to methods for making the tubeless fiber optic cables.

20 Claims, 9 Drawing Sheets

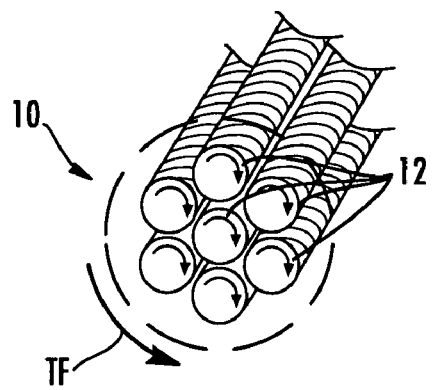 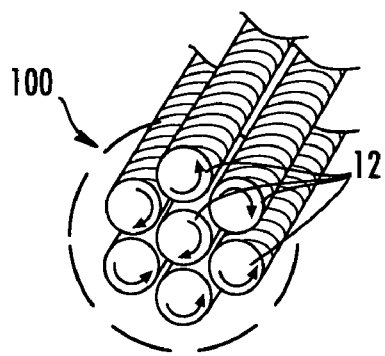
FIG. 2a    FIG. 2b
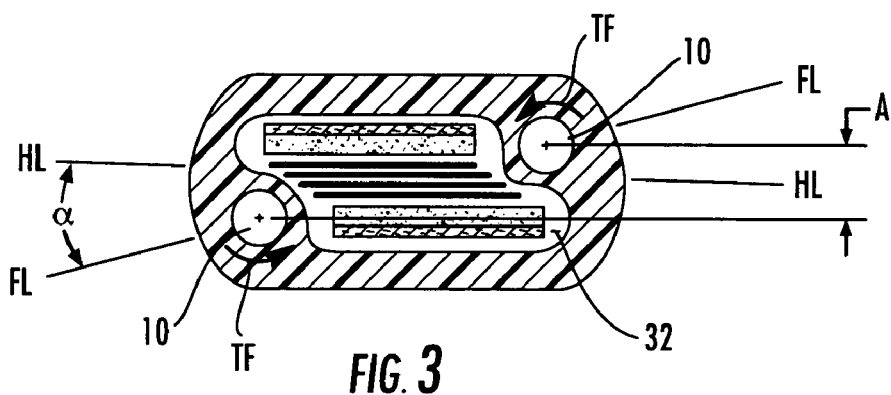
FIG. 3
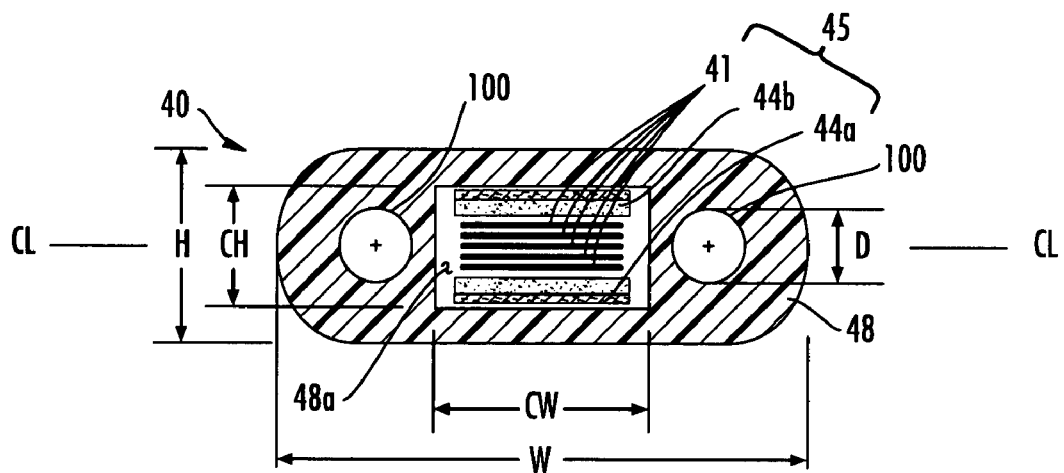
FIG. 4

TUBELESS FIBER OPTIC CABLES HAVING STRENGTH MEMBERS AND METHODS THEREFOR

FIELD OF THE INVENTION

The present invention relates generally to tubeless fiber optic cables having strength members for use in outdoor and/or indoor environments, methods for making the cables, and methods for making strength members. Specifically, the invention uses concepts that inhibit the distortion and/or influence the cross-sectional shape of the tubeless fiber optic cables due to torsional forces from the strength members.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data compared with optical waveguides such as optical fiber. Consequently, optical waveguide cables replaced most of the copper cables in long-haul communication network links, thereby providing greater bandwidth capacity for long-haul links. However, most communication networks still use copper cables for drop links on the subscriber side of the central office, thereby limiting the high-bandwidth capacity of the optical fiber links to the subscriber.

As optical fiber is deployed deeper into communication networks, subscribers will have access to increased bandwidth. But certain obstacles exist that make it challenging, time-consuming, and/or expensive to route optical fiber to the subscriber. As the optical network pushes toward the subscriber, the craft requires solutions that are economical, have a quick and reliable installation, and a small footprint without requiring special installation techniques. Tubeless cables have been developed for meeting these needs. Tubeless cables allow easy access to the optical fibers while having a relatively high optical fiber density for the cable footprint. The present invention discloses improved tubeless fiber optic cables suitable for meeting the needs of the craft.

SUMMARY OF THE INVENTION

Disclosed are tubeless fiber optic cables and assemblies using tubeless fiber optic cables along with methods for making the tubeless fiber optic cables and methods of making strength members. Specifically, the invention uses concepts that inhibit the distortion and/or influence the cross-sectional shape of the tubeless fiber optic cables due to torsional forces from the strength members.

One aspect of the present invention is directed to tubeless fiber optic cables having at least one optical fiber, a cable jacket, a first strength member, and a second strength member. The cable jacket provides a tubeless cable construction having a cross-sectional shape defining a cavity along a longitudinal axis of the fiber optic cable where the first and second strength members are disposed on opposite sides of the cavity. The first strength member and the second strength member having a construction that includes a plurality of strands, wherein the first strength member and the second strength member have an essentially dead-lay thereby inhibiting distortion of a cross-sectional shape of the cable jacket due to torsional forces from the strength members.

Another aspect of the present invention is directed to a method of making a tubeless fiber optic cable including the steps of providing at least one optical fiber, providing a first strength member, providing a second strength member, and applying a cable jacket. The first strength member and the second strength member are disposed on opposite sides of a cavity of the cable jacket. The first strength member and second strength member having a construction that includes a plurality of strands, wherein the first and second strength members have an essentially dead-lay, thereby inhibiting the distortion of a cross-sectional shape of the cable jacket during the manufacturing process.

Yet another aspect of the present invention is directed to a tubeless fiber optic cable including at least one optical fiber, a first strength member, a second strength member, and a cable jacket. The cable jacket provides a tubeless cable construction having a cross-sectional shape defining a cavity along a longitudinal axis of the fiber optic cable where the first strength member and the second strength member are disposed on opposite sides of the cavity. The first strength member and the second strength member have a construction that includes a plurality of strands, wherein the first strength member has a torsional force in a first direction and the second strength has a torsional force in a second direction that is in the opposite of the first direction. Thus, the strength members intentionally distort a cross-sectional shape of the cavity due to torsional forces from the strength members being in opposite directions for allowing more ribbons within the tubeless fiber optic cable.

Additionally, the present invention is directed to a method of making a strength member for a tubeless fiber optic cable. The method comprises the steps of providing a plurality of strands as a plurality of packages; orientating a first package having a first strand so that a twist is induced in the first strand in a first direction as it flys-off its respective package; orientating a second package having a second strand so that a twist is induced in the second strand in a second direction as it flys-off its respective package, wherein the second direction is different than the first direction; orientating one or more subsequent packages having a subsequent strand so that a twist is induced in the subsequent strand in a direction that essentially creates a dead-lay for the strength member; and collecting the plurality of strands, thereby forming the strength member.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

BRIEF DESCRIPTION OF THE DRAWINGS

FIG. 2a depicts a cross-sectional view of a strength member having a plurality of strands with an overall twisted construction due to the plurality of strands being torsionally unbalanced.

FIG. 2b depicts a cross-sectional view of a strength member having a plurality of strands where the strength member has an essentially dead-lay due to the plurality of strands being essentially torsionally balanced.

FIG. 3 depicts a cross-sectional view of a tubeless fiber optic cable having the strength members of FIG. 2a having the twisted construction resulting in the twist of both strength members being in the same direction and distorting the cross-sectional shape of the cable jacket.

FIG. 4 is a cross-sectional view of a tubeless fiber optic cable having the strength members of FIG. 2b having an essentially dead-lay according to the present invention, thereby inhibiting the distortion of the cross-sectional shape of the tubeless fiber optic cable.

DETAILED DESCRIPTION OF THE INVENTION

Figure 1:
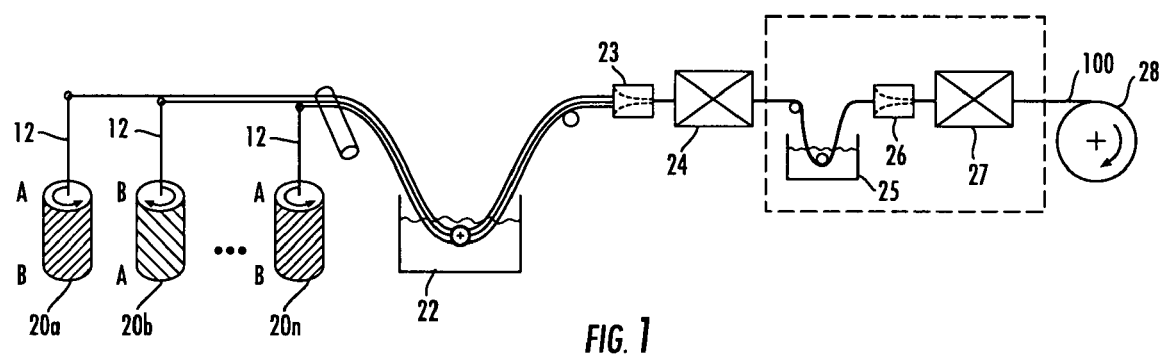
FIG. 1 is a schematic representation of an explanatory method for making strength members for tubeless fiber optic cables according to the present invention.

Reference will now be made in detail to the present preferred embodiments of the invention, examples of which are illustrated in the accompanying drawings. Whenever practical, the same reference numerals will be used throughout the drawings to refer to the same or like parts. Tubeless fiber optic cables of the present invention are different that fiber optic cables having tubes such as mono-tube or loose-tube constructions because tubeless fiber optic cables eliminate the mono-tube or loose tubes, thereby making them less stable during manufacturing and susceptible to distortion or deformation. This is especially true for generally flat cable design with relatively large cavities compared to the overall cable cross-section. In other words, the tube or tube assembly helps stabilize and support the cross-sectional shape of the jacket during manufacturing and removing the same removes the stability and support for the cable jacket, thereby making manufacturing more difficult. More specifically, the present invention is directed to tubeless fiber optic cables and associated methods of manufacturing that influence the shape of the cable jacket due to the torsional forces within the strength members. Other fiber optic structures and assemblies according to the present invention include assemblies such as tubeless fiber optic cables having tether cables, connectors, receptacles, multiports, and/or the like.

FIG. 1 is a schematic representation of an explanatory method for making a strength member 100 for fiber optic cables according to concepts of the invention, which is explained in more detail below. Specifically, FIG. 1 represents a plurality of strands 12 that fly-off a plurality of respective packages 20a, 20b, to 20n during the manufacturing process of strength member 100. When the plurality of strands 12 fly-off respective packages 20a, 20b, to 20n a twist is induced within each individual strand 12 due to the package construction and the twist in the strand generally remains in strength member 100 after manufacturing is complete. It has been discovered that the twist induced into the strands during manufacturing of strength members creates torsional forces that can affect the cross-sectional shape of tubeless fiber optic cables. Thus, using the concepts of the present invention tubeless fiber optic cables are constructed using improved manufacturing techniques for the strength members and/or pre-selecting the torsional characteristics for the strength members of tubeless fiber optic cables.

FIG. 2a depicts a conventional strength member 10 depicting a schematic detail of the construction showing that all of the individual strands 12 are twisted in the same direction such as clockwise (CW) as represented by the plurality of small arrows, thereby imparting an overall twist to strength member 10 that may creates a torsional force TF in the opposite direction as represented by a large arrow when the strength member is subject to stress/strain. Typically, the majority of strands 12 of a conventional strength member have their twist in the same direction such as either CCW or CW. Sampling of a representative batch of conventional strength members revealed that a ratio between strength members having strands with an overall CCW torsional forces and strength members having an overall CW torsional forces was about 9:1. It is believed that this ratio between conventional CCW and CW torsional forces correlates with whether the operator loading the packages on the machinery is right-handed or left-handed since arrangement of the packages on the machinery influences torsional forces in the finished strength member. In other words, the operator of the machinery orientates the packages of strands in the same direction (i.e., same end of the package up for inducing twist in the strands in one direction), thereby creating an overall CCW or CW twist in the strength member. When strength members 10 are used in tubeless fiber optic cables they undesirably distort the cross-sectional shape of the tubeless fiber optic cable because there is not a tube present to help stabilize the construction during manufacturing of the cable.

Another reason tubeless fiber optic cables are subject to distortion is because of certain manufacturing techniques can cause strength members 10 to relax the twist and/or roll during manufacturing. For instance, relatively large tension forces are used for elastically straining strength members 10 as they enter the extrusion tooling during the manufacturing process, thereby creating and controlling excess fiber/ribbon length for the tubeless fiber optic cable. These relatively high-tension forces on strength members 10 during the manufacturing process can cause torsion forces TF to rotate strength members 10 while the polymer of the cable jacket is still molten during manufacturing. Other manufacturing techniques that disturb the strength members such as unreeling or heat may also initiate rotation of strength member 10.

By way of example, FIG. 3 depicts a tubeless fiber optic cable 30 using two strength members 10 that distort the intended shape of the same due to torsional forces TF. Specifically, both strength members 10 have a CCW torsional force TF as represented by the arrows that distorts the cross-sectional shape of a cavity 32 where the optical fibers are located. The distortion of cavity 32 can cause problems such as increasing edge optical fiber attenuation of the ribbons and/or may alter the position of strength members 10, which can result in cutting the same (i.e., weakening) when attempting to open the cable. The present invention solves the distortion problems caused by using conventional strength members 10 in tubeless fiber optic cables.

The distortion from strength members 10 creates an angle α between a first line FL passing through a center of the first strength member and a center of the second member and a second horizontal line HL, thereby quantifying the distortion of the tubeless fiber optic cable. According to the concepts of the present invention angle α is less than 15° such as 5° or less and even can approach values of 2° or less. Thus, the present invention inhibits the distortion caused using conventional strength members.

One concept of the present invention is directed to tubeless fiber optic cables having strength members with a dead-lay construction (i.e., an essentially balanced twist of the strands of the strength member). Illustratively, FIG. 2b depicts a cross-sectional view of a strength member 100 having a plurality of strands 12 with opposing induced twists so that strength member 100 has an essentially dead-lay. In other words, the number of strands 12 having a CW induced twist and the number of strands having a CCW induced twist (as represented by the arrows) are generally similar, thereby imparting an essentially dead-lay to strength member 100. As stated above, the arrangement of the plurality of packages 20 on the machinery during manufacturing of the strength member 100 influences the torsional characteristics of same. Thus, the essentially dead-lay of strength member 100 is created during the manufacture of the same as explained below.

Returning to FIG. 1, it depicts three packages 20a,20b, . . . 20n where each package has a first end A and a second end B. Three packages are shown for the sake of simplicity of the illustration and strength members typically include more than three strands such as ten or more. Thus, the packages of FIG. 1 represent a first package 20a, a second package 20b, and an nth package 20n. The packages have a first end A and a second end B and can be orientated with either end up (A or B) for flying-off strand 12; however, the direction of the twist induced in the strand 12 will depend on which end of the package is orientated in the up position. In other words, if the first end A of the package is orientated upwards the induced twist in strand 12 will be in a first direction as shown by its arrow, whereas if second end B of the package is oriented upwards the induced twist is in a second direction as shown by its arrow. As shown, package 20a has the A end facing up so that the induced twist for that respective strand is in the counter-clockwise (CCW) direction, whereas the second package 20b has the B end facing up to induce a twist for that respective strand in clockwise (CW) direction. Subsequent packages 20 alternate between the A end up then the next package 20 has the B end up and this pattern generally continues until the nth package 20n, thereby constructing a strength member 100 that has an essentially dead-lay construction (i.e., the twist of the strands are essentially balanced such as 5 strands with CW induced twist and 5 strands with CCW induced twist and constructions having odd numbers of strands are essentially balanced).

As shown, the explanatory method of manufacturing strength members 100 also includes the option of passing the plurality of strands 12 into a bath 22 for applying a coating (not visible in cross-sectional views of strength members) for holding strands 12 of strength member 100 together. For instance, a UV coating is applied to strands 12 that then pass into a die 23 that shapes the structure and removes excess coating before being suitably cured at curing station 24, such as a UV lamp for curing the UV coating. Also depicted in FIG. 1 is an optional second bath 25, a second die 26, and a second curing station 27 enclosed by dashed lines for applying a second coating to the structure before strength member 100 is taken-up on a reel 28. Any suitable material may be used for strands 12 in fiber-reinforced plastic such as fiberglass in glass-reinforced plastics (GRPs), and aramid in aramid-reinforced plastic (ARPs), etc.

Figure 1A:
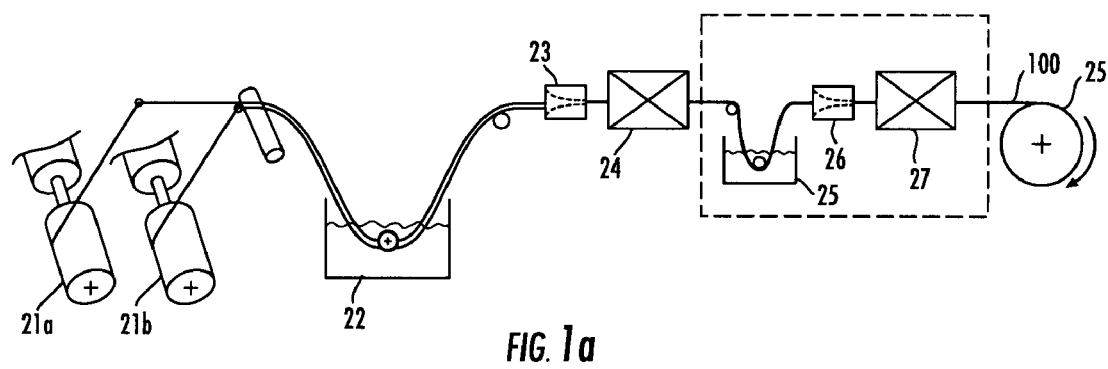
FIG. 1a is a schematic representation of another explanatory method for making strength members for tubeless fiber optic cables.

Other variations for making strength members are possible to create strength members having the desired torsional characteristics according to the present invention. By way of example, FIG. 1a depicts another explanatory manufacturing process for creating strength members where a twist is not induced in the manufacturing process, thereby creating an essentially balanced strength member. Specifically, a plurality of strands 12 are wound-off a plurality of respective packages 21a and 21b that are wound on core or reels and requiring equipment (not numbered) for unwinding.

FIG. 4 shows an explanatory tubeless fiber optic cable 40 having strength members 100 disposed on opposite sides of a cavity 48a that extends along a longitudinal length of the cable according to the present invention. The design is tubeless and its manufacturing process elastically strains the strength members for creating and/or controlling the excess fiber/ribbon length (EFL/ERL) within the same as discussed in more detail in conjunction with FIG. 13. Using strength members 100 having an essentially dead-lay inhibits the distortion, of the cross-sectional shape of the tubeless fiber optic cable 40 due to torsional characteristics of strength members 100 under the relatively high tension forces required to elastically strain the strength members. In other words, strength members 100 inhibit the application of torsional forces on the molten cable jacket because any overall torsional forces in strength members 100 are relatively low since they are essentially balanced. Moreover, strength members 100 are essentially located on the centerline of the tubeless fiber optic cable such as within 0.5 millimeters of the centerline. Tubeless fiber optic cable 40 has a generally flat shape, but the concepts of the invention are suitable with any suitable cross-sectional shape for the cable such as round. Tubeless fiber optic cable 40 also includes at least one optical waveguide (not visible) that is a portion of one of a plurality of optical fiber ribbons 41 (represented by the horizontal lines) and a plurality of dry inserts 44a,44b that are at least partially disposed within cavity 48a of a cable jacket 48. As depicted, the major (e.g. planar) surfaces (not numbered) of dry inserts 44a,44b are generally aligned with major (e.g. horizontal) surfaces (not numbered) of cavity 48a, thereby allowing a compact and efficient configuration while generally inhibiting corner fiber contact as occurs with a ribbon stack in a round tube. In this embodiment, dry inserts 44a,44b sandwich the plurality of ribbons 41 in a non-stranded stack, thereby forming a tubeless cable core 45. Consequently, the optical fiber ribbons 41, major surfaces of the dry inserts 44a,44b, and major surfaces of cavity 48a are generally aligned (i.e., generally parallel). Additionally, dry inserts 44a,44b of this embodiment contact at least a portion of respective top or bottom ribbons.

Ribbon 41 includes twenty-four optical fibers and is a portion of a ribbon stack (not numbered) formed by the plurality of ribbons 41 that are at least partially disposed within cavity 48a of cable jacket 48. Ribbons of the stack may employ a splittable construction using subunits and/or stress concentrations as known in the art, thereby allowing separation of the ribbon into smaller groups of optical fibers. Of course, ribbons could use any suitable number of optical fibers and/or different ribbons could have different numbers of optical fibers. First dry insert 44a and second dry insert 44b are disposed within cavity 48a and are generally disposed on opposite sides of the ribbon stack. Dry inserts 44a,44b act to couple, cushion, and allow movement and separation of the ribbons (or optical fibers) to accommodate bending of tubeless fiber optic cable 40. Moreover, one or more of the dry inserts may optionally provide water-blocking.

Tubeless fiber optic cables like cable 40 are advantageous as distribution cables since they can have a relatively high optical fiber count with a relatively small cross-sectional footprint. By way of example, one explanatory embodiment of tubeless fiber optic cable 40 has four ribbons with each ribbon having twenty-four optical fibers for a total fiber count of ninety-six optical fibers. Additionally, the four ribbons of this explanatory embodiment have an excess ribbon length (ERL) of about 0.5% or more such as in range of about 0.6% to about 1.2%. With twenty-four fiber ribbons, cable 40 has a major cable dimension W of about 15 millimeters or less and a minor cable dimension H of about 8 millimeters or less. Furthermore, strength members 100 of this explanatory embodiment are glass-reinforced plastic (GRPs) having a plurality of strands 12 held together by a coating and the GRPs have a dimension D of about 2.3 millimeters, which is smaller than the height of cavity 48a. The minimum bend radius of this explanatory embodiment is about 150 millimeters which allows the cable to be coiled in a relatively small diameter for slack storage. Of course, other suitable fiber/ribbon counts, components, ERL, minimum bend radii, and/or cable dimensions are possible with the concepts of the invention. Illustratively, tubeless fiber optic cables similar to cable 40 could have ribbons with different fiber counts such as: (1) twelve fiber ribbons with a major cable dimension W of about 12 millimeters or less for a total of forty-eight optical fibers; (2) thirty-six fiber ribbons with a major cable dimension W of about 18 millimeters or less for a total of one-hundred and forty-four optical fibers; or (3) forty-eight fiber ribbons with a major cable dimension W of about 21 millimeters or less for a total of two-hundred and sixteen optical fibers.

Cavity 48a has a cavity height CH and a cavity width CW. By way of example for explanatory embodiment discussed above, each ribbon 41 has a height of about 0.3 millimeters for a total fiber (ribbon) height FH of about 1.2 millimeters (4 times 0.3 millimeters) and cavity 48a has a cavity height CH of about 5.5 millimeters. Cavity width CW is generally determined by the width of the ribbons (or number of optical fibers) intended for the cable and would be about 7.5 millimeters for the twenty-four fiber ribbons. Dry inserts 44a,44b occupy the cavity on the top and bottom of the ribbon stack. In one embodiment, dry inserts 184a,184b have an uncompressed height of about 1.8 millimeters, but other suitable uncompressed heights for dry inserts are possible. The compression of the dry inserts 44a,44b is the localized maximum compression of the dry insert and generally occurs where the ribbon or ribbon stack has the maximum displacement from the neutral axis of the cable. Moreover, this localized maximum compression create the coupling of the optical fibers/ribbons to the cable jacket.

Illustratively, the explanatory embodiment has a total height for the uncompressed dry inserts and the ribbon (fiber) height of about 4.8 millimeters, which is less than the cavity height of 5.5 millimeters. Consequently, a normalized ribbon pullout force is generally caused by the undulating ribbon stack causing localized maximum compression due to the ERL and/or friction. By way of example, proper coupling of the ribbon stack (or ribbons or optical fibers) may be achieved when the combined uncompressed height of the dry inserts is about 40% or more of the cavity height CH such as by using two 1 millimeter dry inserts with a cavity having a cavity height CH of about 5 millimeters. Of course, other suitable ratios are possible as long as optical performance is preserved. In the explanatory embodiment, the combined uncompressed height (2 times 1.8 millimeters equals 3.6 millimeters) of the dry inserts is about 65% of the cavity height CH (5.5 millimeters), which is more than 50% of the cavity height CH. Of course, the cavity, ribbons, and/or dry inserts can have other suitable dimensions while still providing suitable performance. For instance, thinner ribbons and/or dry inserts may be used. Although cavity 48a is depicted as rectangular, the extrusion process may create the cavity with a somewhat irregular rectangular shape. Likewise, the cavity can have other suitable shapes besides generally rectangular such as oval, round or the like, which may generally change the relationship (alignment) among the dry insert, ribbon, and/or cavity.

Dry inserts 44a,44b may be any suitable material such as a compressible layer of, for instance, a longitudinal foam tape for cushioning, coupling, allowing movement of and accommodating bending of the ribbon(s) (or optical fiber(s)) within cavity 48a or other suitable materials. Optionally, the compressible layer may also include a water-swellable component such as a tape, thread, yarn, or the like wrapped about the foam tape or attached thereto. However, the dry insert need not include a compressible layer. Other constructions for dry inserts are described herein. No matter the construction and/or materials of the dry insert it should provide a suitable level of coupling of the optical waveguides to the cable jacket. Additionally, in order to quantify the amount of coupling for the optical waveguides a relatively long length of fiber optic cable is required. By way of example, optical fibers of cables according to the present invention have a coupling force of at least about 0.1625 Newtons per optical fiber for a thirty-meter length of fiber optic cable. Illustratively, a fiber optic cable having a single ribbon with twelve optical fibers in the ribbon should have a coupling force of about 1.95 Newtons or greater for a thirty-meter length of fiber optic cable. Likewise, a similar fiber optical cable having a single optical fiber ribbon with six optical fibers should have a coupling force of about 0.975 Newtons or greater for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the EFL (or ERL) must be straightened so that the coupling force is the amount of force required to move the entire length of optical fibers within the thirty-meter fiber optic cable sample.

As depicted, dry inserts 44a,44b may optionally also include a water-swellable layer for blocking the migration of water along cavity 48a. By way of example, the dry insert may include a water-swellable tape that is laminated to a compressible layer such as an open-cell polyurethane foam tape, but of course other suitable materials and construction are possible for dry insert(s). Likewise, tubeless fiber optic cables of the present invention may have a dry insert and a separate water blocking component such as a water-swellable yarn or thread disposed within the cavity. In other words, the dry insert and water blocking component may be separate components. As depicted, the water-swellable layer of dry inserts 44a,44b generally faces the cavity (i.e. is separated from the optical fibers or ribbons), but it other embodiments the water-swellable layer may face the optical fiber(s) or ribbons. In a further cable variation, water-swellable tapes need not be generally aligned with the ribbons in a sandwich configuration like in cable 40, but instead may have other constructions. Generally speaking, positioning dry inserts on opposite sides of the ribbon stack (or single ribbon or loose optical fibers) aids in influencing and maintaining a generally uniform ERL distribution along the cable during different conditions, thereby helping to preserve optical performance.

Cable jacket 48 may use any suitable material such as a polymer or the like. Cable jacket materials may also have flame-retardant, low-smoke zero halogen (LSZH), or other suitable characteristics for meeting the desired ratings such as general purpose, riser, plenum, indoor/outdoor, or the like. Suitable materials include polyethylene (PE), polyvinylchloride (PVC), polypropylene (PP), thermoplastic elastomers (TPE), polyurethane (PU), fluoropolymers, flame-retardant polyethylene (FRPE), flame-retardant polypropylene (FRPP), flame-retardant thermoplastic elastomers (FRTPE), flame-retardant polyurethanes (FRPU), blends thereof, or the like. By way of example, the cable jacket could include flame-inhibiting materials or agents such as antimony trioxide, aluminum trihydrate, zinc borate, magnesium hydroxide, or other known materials for meeting the desired rating. Further, cable jacket 18 can also use a material that inherently provides a flame-retardant rating such as PVC, FRPE, FRPP or the like, thereby achieving the desired rating.

Illustratively, fiber optic cables for riser-ratings use a PVC jacket. Examples of suitable materials include PVCs having an limiting oxygen index (LOI) of about 28% or greater such as available from AlphaGary of Leominster, Mass. under the tradenames GW 2337-A or GW 2271 and which provide suitable low-temperature handling or from Georgia Gulf Corporation of Atlanta Ga. under the tradename NAP 16881. Likewise, examples of suitable FRPEs having an LOI of about 35% or greater are available from AlphaGary under the tradename Sentra 8142. For plenum-rated fiber optic cables, the jacket is a PVDF or other suitable materials such as fluoropolymers like FEP, MFA, other fluoropolymer-based compound, or even PVCs that have LOI values of greater than 40% examples of which are available form AlphaGary under the SmokeGuard tradename or from Teknor Apex of Pawtucket, R.I. under the FireGUARD tradename.

Additionally, tubeless fiber optic cables may have other suitable components such as one or more optional ripcords, armor, flame-retardant tapes that char or resist burning, water-swellable components such as a yarn, thread, tape, and powder, tonable lobes, or other suitable cable components. Further, variations of cable components and/or structures are also possible. Illustratively, strength members 100 can include a coating for promoting bonding with the cable jacket such as a thermoplastic material, ethylene-acrylic acid (EAA), ethylene-vinyl acetate (EVA), rubber, or the like.

Likewise, tubeless fiber optic cables of the invention can package the optical fiber in other ways beside the fiber optic ribbon such as one or more loose optical fibers, buffered optical fibers, bundles of optical fibers, modules of optical fibers, or the like. Moreover, any suitable type of optical fiber such as multimode, single-mode, bend-performance, etc. may be used.

Figure 5:
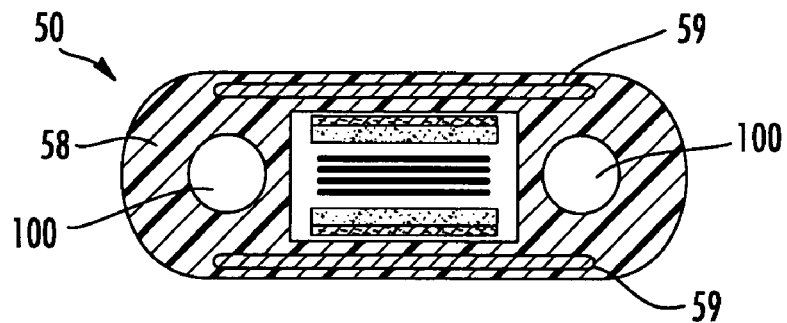
FIG. 5 is a cross-sectional view of another tubeless fiber optic cable having strength members with an essentially dead-lay according to the present invention.

FIG. 5 depicts a tubeless fiber optic cable 50 that is similar to cable 40 with strength members 100 on opposite sides of the cavity, but it further includes at least one armor layer 59 and in this instance two armor layers 59. Armor layers 59 are respectively positioned above and below the cavity for inhibiting unintended breaches of cable jacket 58 such as from rodents or point crushing contacts. Armor layer 59 can be formed from any suitable material such as a conductive material such as steel or a dielectric such as polyamide, polycarbonate, or a braided fabric formed from fiberglass, aramid or the like. Other embodiments similar to tubeless fiber optic cable 50 are possible such as disposing two armor layers between layers of the cable jacket; instead, of being disposed within the single layer of the cable jacket. For instance, armor layers 59 could be disposed between a layer of cable jacket material and a second layer of cable jacket material.

Figure 6:
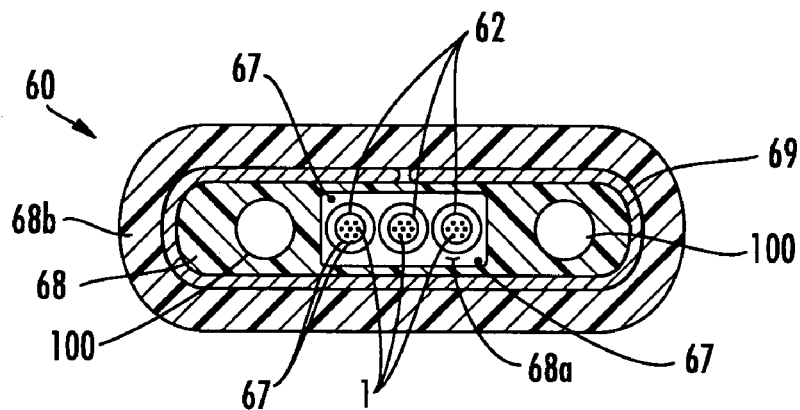
FIG. 6 is a cross-sectional view of another tubeless fiber optic cable having strength members with an essentially dead-lay according to the present invention.

Other variations of tubeless armored cables are also possible. By way of example, FIG. 6 depicts tubeless fiber optic cable 60 that includes at least one armor layer 69. Tubeless fiber optic cable 60 is similar to tubeless fiber optic cable 50 with strength members 100 disposed on opposite side of the cavity, but it also includes an armor layer 69 disposed about a cable jacket 68 and is further upjacketed with a second jacket 68b, thereby covering armor layer 69. Additionally, tubeless fiber optic cable 60 has a plurality of optical fibers 1 disposed in modules 62. Modules 62 include a thin sheath (not numbered) that groups and protects the optical fibers therein; however, the thin sheath does not provide support for maintaining the cavity shape during manufacturing. Consequently, the design is still a tubeless fiber optic cable according to the invention. Modules 62 can include one or more water-swellable components 67 and/or the water-swellable components are disposed outside modules 62, but within cavity 68a. In other variations, a thixotropic grease or gel is included within the thin sheath of the modules for blocking the migration of water therein.

Figure 7:
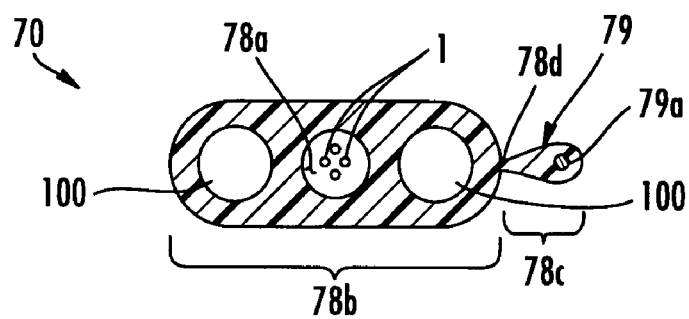
FIG. 7 is a cross-sectional view of another tubeless fiber optic cable having strength members with an essentially dead-lay according to the present invention.

Tubeless fiber optic cables can have other cable components and/or cross-sectional shapes. For instance, FIG. 7 depicts tubeless fiber optic cable 70 having strength members 100 and further includes a toning portion 79 for locating the same when buried. Tubeless fiber optic cable 70 includes loose optical fibers 1 disposed within a generally round cavity 78a of cable jacket 78 which also may include a thixotropic grease or gel for blocking the migration of water along cavity 78a. Cable jacket 78 includes a main cable body 78b and toning portion 78c that are connected by a web 78d that is frangible for separating the toning portion 78b from the main cable body 78a. Toning portion 79 also includes a toning wire 79a that is typically a small gauge copper wire or copper-clad steel wire, thereby providing a sufficiently low resistance for allow a toning signal over relatively long distances of the tubeless fiber optic cable.

Figure 8:
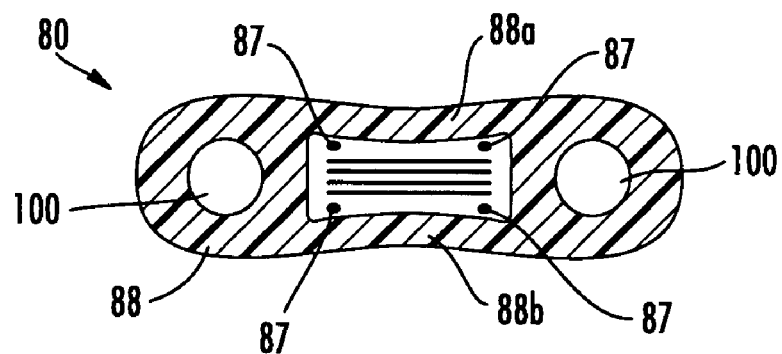
FIG. 8 is a cross-sectional view of another tubeless fiber optic cable having strength members according to the present invention.

FIG. 8 depicts another tubeless fiber optic cable 80 that has a slightly different cross-sectional shape for improving side crush performance. Tubeless fiber optic cable 80 depicts a generally dogbone cross-section for cable jacket 88 that generally speaking has a concave upper wall 88a and a concave lower walls 88b for improving side crush performance. In other words, the concave upper and lower walls significantly increase the force required to buckle the upper and lower walls of cable jacket 88. Tubeless fiber optic cable 80 also includes a plurality of water-swellable components 87 such as yarns, threads or the like within the cavity for blocking the migration of water along the same. Of course, other cross-sectional shapes are possible with the concepts of the invention.

Figure 9:
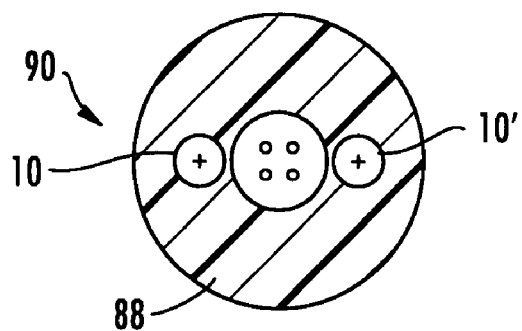
FIG. 9 is a cross-sectional view of another tubeless fiber optic cable having strength members that includes strength members according to the present invention.

FIG. 9 depicts another tubeless fiber optic cable 90 that has a generally round cable jacket 88 with strength members 10 and 10' that have opposing torsional forces. In other words, the majority of strands of strength member 10 have an induced twist in a first direction and a majority of strands of strength member 10' have an induced twist in a second direction as represented by the arrows. Thus, the distortion of cable jacket 88 is reduced compared with tubeless fiber optic cables having strength members where the induced twist in same direction. Of course, other cross-sectional shapes are possible with strength members having induced twists in opposed directions.

Figure 10:
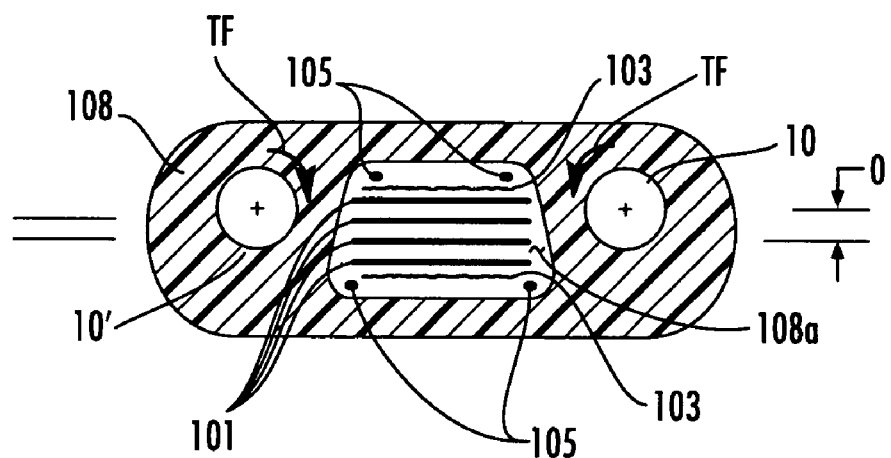
FIG. 10 is a cross-sectional view of another tubeless fiber optic cable having strength members that includes strength members that are twisted in opposite directions according to the present invention.

By way of example, FIG. 10 depicts a generally flat tubeless fiber optic cable having strength members 10 and 10' with opposing torsional forces within the tubeless fiber optic cable. The tubeless fiber optic cable shown includes a plurality of ribbons 101 disposed within a cavity 108a of cable jacket 108, which is an essentially dry design since it includes a coupling agent 103 and a plurality of water-swellable components 105. Specifically, cavity 108a includes coupling agent 103 such as a thixotropic grease or silicone based gel that does not fill the cavity cross-section, but instead is used for creating a coupling force between ribbons 101 and cable jacket 108. Whereas, the plurality of water-swellable components 105 are for blocking the migration of water along the cavity 108a.

As shown, the torsional forces of strength members 10 and 10' distort cavity 108a such that a lower portion of the cavity is wider than an upper portion of the cavity. Moreover, the strength members 10 and 10' are located above the centerline, which is beneficial for allowing lower ERL. This is because when this tubeless fiber optic cable is coiled in the right direction the radially outermost ribbon is closer to the neutral axis than would otherwise occur, thereby requiring less excess ribbon length. More specifically, using strength members 10 and 10' with opposing torsional forces causes the strength members to have an offset O from a center-line of the cross-section as depicted such as about 0.5 millimeters or more. Because strength members 10 and 10' are offset, the neutral axis of the tubeless fiber optic cable is also shifted from the center-line, which results in unequal bending forces for bending in the preferential direction of the tubeless fiber optic cable. Thus, creating a preferential coil direction (i.e., the preferential coil direction is to the side with the higher bending force) for the tubeless fiber optic cable. In other words, the radially outermost ribbon of the stack is closer to the neutral axis when the cable is bent in the preferential coil direction. Consequently, less excess ribbon length is required for the ribbons. The preferential coil direction could be indicated to the craft by a locating the print statement on the side of the tubeless fiber optic cable which when coiled would face outward.

Figure 11:
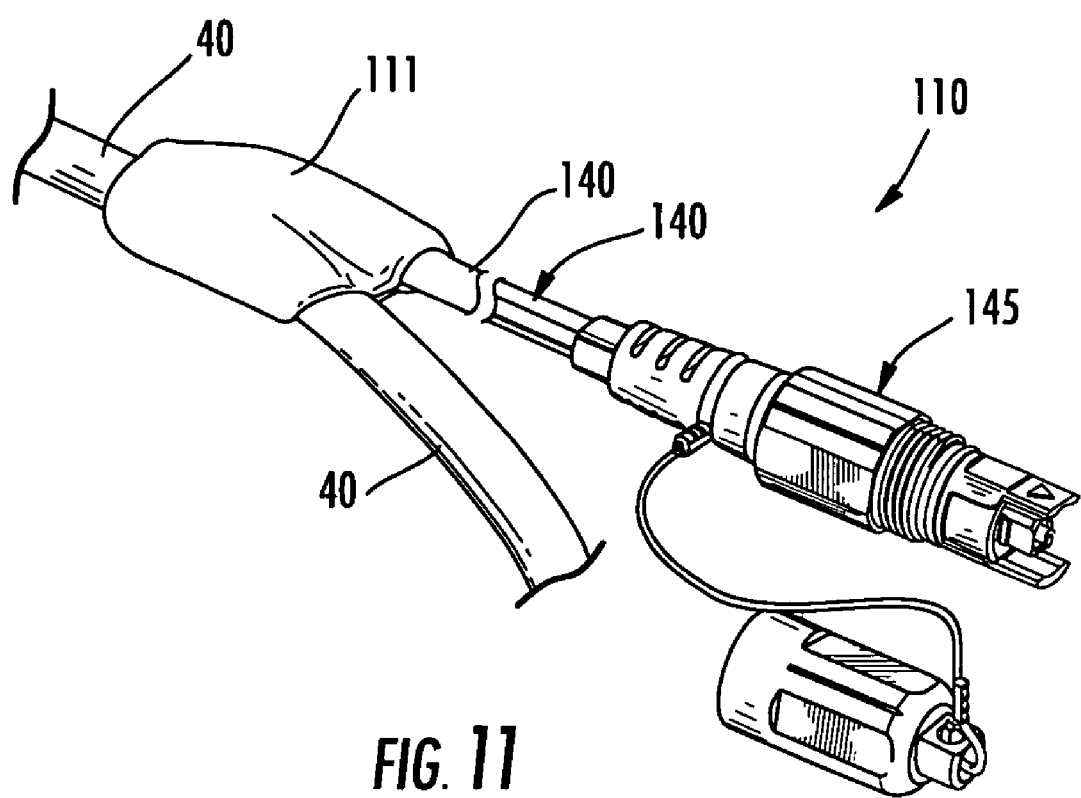
FIG. 11 depicts a perspective view of a fiber optic cable assembly that includes the tubeless fiber optic cable of FIG. 2 along with a tether cable that is preconnectorized with a hardened connector according to the present invention.
Figure 12:
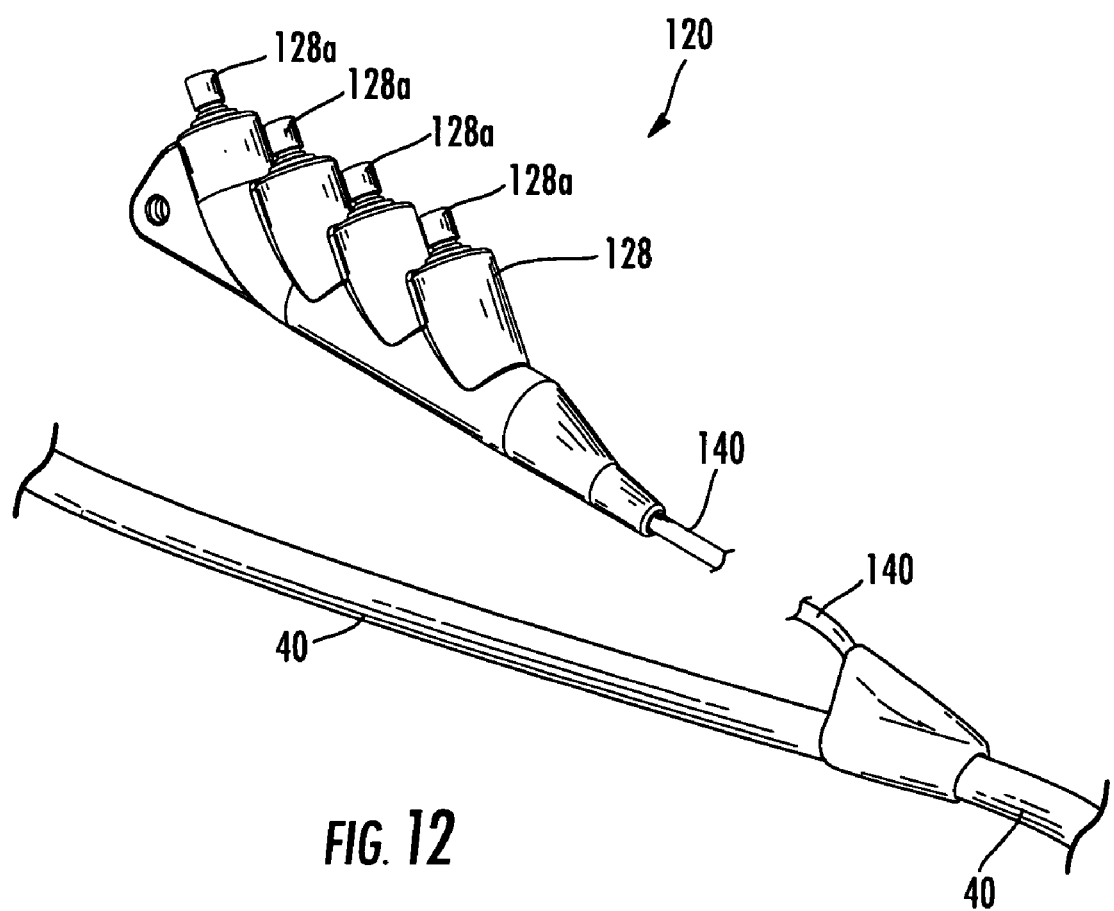
FIG. 12 depicts another perspective view of a fiber optic cable assembly that includes the tubeless fiber optic cable of FIG. 2 along with a tether cable having a multiport according to the present invention.

A variety of fiber optic assemblies may be constructed from tubeless fiber optic cables of the present invention. For instance, FIG. 11 depicts fiber optic cable assembly 110 that includes tubeless fiber optic cable 40 as a portion of a distribution cable assembly. As shown, a tether cable 140 is attached to tubeless fiber optic cable 40 at a first end and includes a protective covering 111 for covering the splice portion between tubeless fiber optic cable 40 and tether cable 140. A second end of tether cable 140 can include one or more ferrules attached thereto and the ferrule may be a portion of a receptacle, plug, or the like for plug and play connectivity. Illustratively, FIG. 11 depicts a hardened plug connector 145 on the second end of tether cable 140. Of course, the second end of tether cable 140 can have any suitable configuration for connectivity such as splice-ready optical fibers, a connector or a receptacle having a ferrule, a multi-port or the like, thereby allowing the craft flexibility for downstream connectivity. FIG. 12 depicts a fiber optic cable assembly 120 similar to FIG. 11 but it includes a multi-port 128 having a plurality of receptacles 128a attached to a second end of tether cable 140. Likewise, other types and/or structures are possible for fiber optic assemblies according to the concepts of the invention. For instance, a hardened connector or receptacle could be directly attached to the tubeless fiber optic cable.

Figure 13:
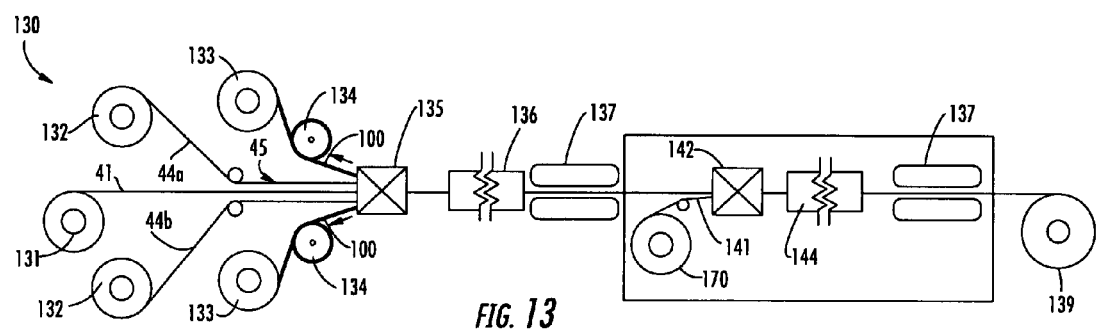
FIG. 13 depicts a schematic representation of a explanatory method for making tubeless fiber optic cables according to the present invention.

FIG. 13 schematically illustrates an exemplary one-pass manufacturing line 130 for tubeless fiber optic cables according to the present invention such as shown in FIG. 4; however, other variations of the concepts may be used to manufacture other assemblies and/or cables according to the concepts of the present invention. One pass manufacturing line 130 includes at least one optical ribbon payoff reel 131, a plurality of dry insert payoff reels 132, a plurality of strength member payoff reels 133, a plurality of strength member capstans 134, a cross-head extruder 135, a water trough 136, one or more caterpullers 137, and a take-up reel 139. Additionally, tubeless fiber optic cables may further include an armor layer and a second cable jacket therearound, thereby forming a tubeless fiber optic cable similar the cable illustrated in FIG. 6. The armor layer and/or second cable jacket can be manufactured on the same line or on a second manufacturing line.

The explanatory manufacturing process includes paying-off at least one optical fiber ribbon 41 and dry insert 44a,44b from respective reels 131, 132, and 132. Only one payoff reel for optical fiber ribbon 41 is shown for clarity. However, manufacturing lines can include any suitable number of payoff reels for one or more ribbons or optical fibers in order to manufacture assemblies and/or cables according to the present invention. Thereafter, dry inserts 44a,44b are generally positioned about optical fiber ribbon 41, thereby forming cable core 45 (i.e. a dry insert-ribbon composite stack or sandwich). Additionally, strength members 100 are paying-off respective reels 133 under a relatively high tension (e.g. between about 100 to about 400 pounds) using respective strength member capstans 134, thereby elastically stretching strength members 100 (represented by the arrows) so that ERL is produced in the tubeless fiber optic cable. In other words, after the tension is released on strength members 100 they return to their original unstressed length (i.e. shorten), thereby producing ERL since the ribbons were introduced into the cable with about the same length as tensioned strength members and the ribbons were not stretched. Stated another way, the amount of ERL produced is equal to about the strength member strain (i.e., elastically stretching of the strength member) plus any plastic shrinkage of the cable jacket that may occur. The strength member strain can create a significant amount of ERL or EFL in a one-pass production such as 10% or more, 25% or more, 50% or more, and even up to 80% or more of the total ERL or EFL within the cable. Furthermore, elastically stretching of the strength member is advantageous since it allows for a precise control of the amount of ERL or EFL being introduced into the cable and greatly reduces strength member pistoning since the finished cable jacket is in compression instead of tension. For the manufacture of tubeless fiber optic cable 40, about 95% of ERL is introduced into the cable by elastically stretching the strength members. Thereafter, cable core 45 and strength members 100 are fed into cross-head extruder 135 where cable jacket 48 is extruded about cable core 45 and strength members 100, thereby forming the tubeless fiber optic cable 40. As shown by FIG. 13, cable jacket is being applied about the optical fibers and strength members by cross-head extruder 135 while the strength member is elastically stretched. After extrusion, cable 40 is then quenched in water trough 136 while the strength member is still elastically stretched, thereby allowing the cable jacket to "freeze" on the stretched strength members. Tubeless fiber optic cable 40 is pulled through the manufacturing line using one or more caterpullers 137 and then wound onto take-up reel 139 under low tension (i.e., the tensile force that elastically stretched the strength members is released and strength members return to a relaxed length thereby creating ERL or EFL in the cable). As depicted in the box, one manufacturing line may be used to form a tubeless fiber optic cable similar to tubeless fiber optic cable 60. As shown, a second caterpuller 137 is used for pulling the cable assembly as the armor layer 141 is paid-off a reel 170 and formed about cable 40 using suitable armor forming equipment (not depicted), and a second jacket is extruded thereover using a cross-head extruder 142. Thereafter, the tubeless fiber optic cable armored cable passes into a second water trough 144 before being wound-up on take-up reel 139. Additionally, other cables and/or manufacturing lines according to the concepts of the present invention are possible. For instance, cables and/or manufacturing lines may include a water-swellable tape, yarn, or the like; however, the use of one or more other suitable cable components is possible.

Figure 14:
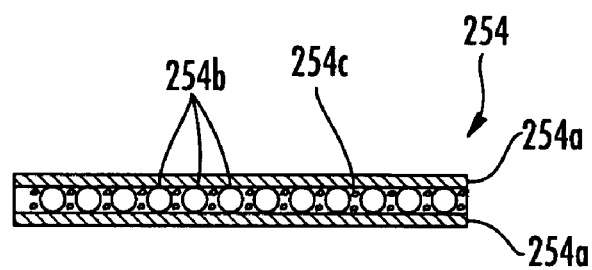
FIGS. 14-17 depict other dry insert constructions suitable with tubeless fiber optic cables according to the present invention.

FIGS. 14-17 depict other dry insert constructions of the present invention for cushioning, coupling, and/or allowing movement of the optical fibers. Moreover, like the other dry inserts the water-swellable layer is optional and may use any suitable material(s)/construction(s). FIG. 14 depicts one example of another dry insert 254. Dry insert 254 includes a compressible layer formed from a plurality of microspheres 254b disposed between a top tape 254a and bottom tape 254a. As with other tapes, tapes 254a can be formed from any suitable material such as a non-woven material, Mylar, or other like materials. More specifically, microspheres 254b are generally disposed between tapes 254a and are attached using a suitable method such as an adhesive, bonding agent, application of heat and/or pressure, or the like. Additionally, an optional water-swellable substance such as a plurality of water-swellable particles or water-swellable coating 254c may also be disposed between tapes 254a with microspheres 254b or on a portion one or more tapes 254a. Suitable materials for microspheres 254b are relatively soft so they are compressible and sized so that they will not cause undue levels of optical attenuation if they press against the optical waveguide or optical fiber ribbon. By way of example, suitable hollow microspheres are available from Akzo Nobel of the Netherlands under the trade name EXPANCEL® and includes copolymers of monomers vinylidine chloride, acrylonitrile, and methylmethacrylate. Other plastic hollow microspheres are available from Asia Pacific Microspheres of Malaysia under the tradename of PHENOSET®, which are phenolic and amino-based microspheres.

The compressible nature of hollow polymeric microspheres is suited for providing adequate coupling of the optical fibers to the cable jacket or tube. Additionally, the smooth round surface of these microspheres permits pressing against the optical fibers without inducing elevated levels of optical attenuation such as during bending, twisting, or crushing of the optical fiber cable. Additionally, the size of the hollow microspheres can vary from about 1 micron to about 300 microns, likewise, a wall thickness of the microspheres can also vary from about 0.1 micron up to several microns, but other suitable dimensions are possible as long as a suitable level of optical performance is maintained.

Figure 15:
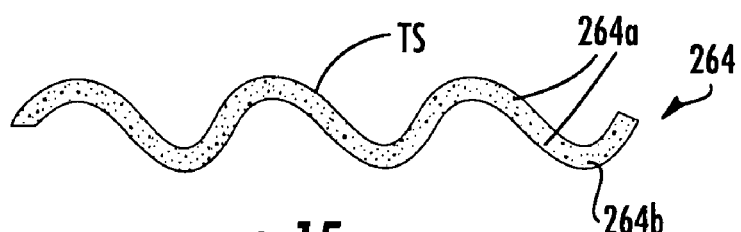

FIG. 15 depicts another example of a dry insert 264 that provides a compressible layer 264b using the geometry of its shape. More specifically, compressible layer 264b is provided by using a dimensional fabric 264a that has a generally textured shape in one or more directions for providing the compressible layer. As shown, dry insert 264 includes a generally textured shape TS and is formed from a suitably soft and flexible material so that it can deform for providing an adequate level of coupling for the optical fibers or ribbons without causing undue levels of optical attenuation. By way of example, suitable fabrics are available from Freudenberg of Durham, N.C. under the name of Novolon. The dimensional fabrics may be formed from a variety of materials such as polyester, polypropylene, nylon, or other suitable materials. Generally speaking, dimensional fabrics are formed using a molding process for transforming a two-dimensional (i.e., flat) fabric or substrate into a three-dimensional (i.e., textured shape) fabric or substrate with the desired textured shape TS. The coupling and/or compressibility of dry insert 264 can be tailored by changing parameters such as the number of contact points per surface area (i.e., changing the density of high and low contact points), the height from a high point to a low point, the dimension fabric profile, and/or flexibility of the dimensional fabric. Again, dry insert 264 can include an optional water-swellable layer for blocking the migration of water along the cable or tube assembly. For instance, the water-swellable layer may be a coating applied to one or more surfaces or applied to the fibers of the dimensional fabric, include water-swellable particles disposed in or on the dry insert, and/or may include superabsorbent fibers. Suitable water-swellable filaments are, for example, LANSEAL® materials available from Toyobo of Osaka, Japan or OASIS® materials available from Technical Absorbents Ltd. of South Humberside, United Kingdom.

Figure 16:
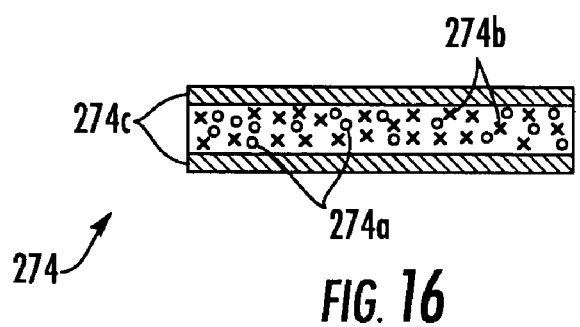
Figure 17:
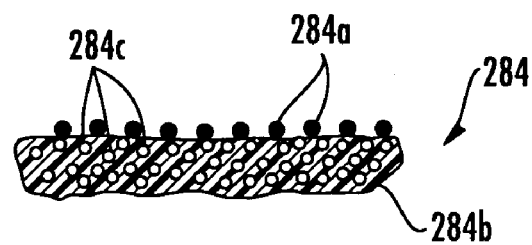

FIG. 16 depicts a further embodiment of a dry insert 274 having a compressible layer 274b having a non-woven layer of felt substance made of one or more materials formed from non-continuous and/or continuous filaments. Dry insert 274 may optionally include a water-swellable layer and/or one or more tapes for attaching the felt substance thereto. For instance, dry insert 274 includes a plurality of water-swellable filaments 274a along with other filaments 274b that are non-swellable disposed between a plurality of optional tapes 274c, thereby forming dry insert 274, As used herein, felt substance means a material comprising one or more types of non-continuous or continuous filaments and/or fibers which have been caused to adhere and/or matt together through the action of heat, moisture, chemicals, pressure, or mechanical action such as needle-punching or spun-lacing, or a combination of the foregoing actions, thereby forming a relatively thick and compressible layer. Water-swellable filaments 274a may comprise any suitable water-swellable material. By way of example, dry insert 274 of FIG. 16 may include about 25% or less by weight of water-swellable filaments 274a and about 75% or more by weight of other filaments 274b; however, other suitable ratios are possible. Other filaments 274b may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 274b and may be tailored for providing specific characteristics. FIG. 17 depicts yet another dry insert 284 shaped as a generally flat tape having a compressible layer with a suitable width. By way of example, dry insert 284 is made of a plurality of filaments 284c such as a plurality of generally continuous polyester filaments grouped together by a compressible layer 284b that acts as a matrix material, but the use of other filament materials is possible. Compressible layer 284b is formed by, for instance, foaming the matrix material. Additionally the matrix material is used for attaching a plurality of water-swellable particles to dry insert 284 for forming a water-swellable layer 284a. Suitable foamed matrix materials include vinyls, polyurethanes, polypropylenes, EVAs, or polyethylene blends. The plurality of filaments and the matrix material are run through a die that forms dry insert 284 into its desired shape such as a generally flat ribbon-like profile. Dry inserts 284 may be run parallel to the fiber ribbons in a single layer or sandwich configuration or have other configurations such as helically wrapped about the optical fibers or ribbon stack. Other similar constructions are possible using any suitable materials for providing the compressible layer 284b and the water-swellable layer 284a. Dry insert can include still other constructions and/or materials such as sponge-like materials for a compressible layer such as polyvinylalcohol (PVA). Further, dry inserts can include other suitable materials and/or layers for other purposes such as a flame-retardant material and/or layer.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A tubeless fiber optic cable comprising:
   at least one optical fiber; and
   a cable jacket, the cable jacket providing a tubeless cable construction having a cross-sectional shape defining a cavity along a longitudinal axis of the fiber optic cable; and
   a first strength member and a second strength member having a construction that includes a plurality of strands, the first strength member and the second strength member being disposed on opposite sides of the cavity, wherein the first strength member and the second strength member have an essentially dead-lay thereby inhibiting distortion of a cross-sectional shape of the cable jacket due to torsional forces from the strength members.

2. The tubeless fiber optic cable of claim 1, the at least one optical fiber being a portion of a fiber optic ribbon.

3. The tubeless fiber optic cable of claim 1, wherein the plurality of strands of the first strength member have an induced twist that is essentially balanced and the plurality of strands of the second strength member have an induced twist that is essentially balanced.

4. The tubeless fiber optic cable of claim 1, further including an angle (α) that is defined as the angle between a first line passing through a center of the first strength member and a center of the second member and a second horizontal line, wherein the angle (α) is about fifteen degrees or less.

5. The tubeless fiber optic cable of claim 1, the cavity having a generally rectangular shape and the at least one optical is a portion of fiber optic ribbon.

6. The tubeless fiber optic cable of claim 1, the cavity having a generally rectangular shape and the cross-sectional shape of the cable jacket having a generally flat profile.

7. The tubeless fiber optic cable of claim 1, wherein the fiber optic cable is a portion of distribution fiber optic cable assembly that includes one or more structures selected from a tether fiber optic cable, a multi-port, a connector, and a receptacle.

8. The tubeless fiber optic cable of claim 1, further including a dry insert for coupling the at least one optical fiber to the cable jacket.

9. The tubeless fiber optic cable of claim 1, further including a dry insert, the dry insert including a compressible layer and a water-swellable layer, wherein the dry insert couples the at least one optical fiber to the cable jacket with a predetermined force.

10. The tubeless fiber optic cable of claim 1, further including a dry insert, wherein the dry insert includes at least one material selected from the group of a plurality of microspheres, a dimensional fabric, a felt substance, and a plurality of filaments in a matrix material.

11. The tubeless fiber optic cable of claim 1, the at least one optical fiber being a portion of a fiber optic ribbon and the fiber optic ribbon is sandwiched between a first dry insert and a second dry insert.

12. The tubeless fiber optic cable of claim 1, the fiber optic cable further including an armor layer.

13. The tubeless fiber optic cable of claim 1, the fiber optic cable having at least one micromodule or bundle within the cavity.

14. The tubeless fiber optic cable of claim 1, the first strength member and the second strength member being glass-reinforced plastic strength members.

15. The tubeless fiber optic cable of claim 1, the tubeless fiber optic cable being flame-retardant.

16. The tubeless fiber optic cable of claim 1, wherein the at least one optical fiber has a coupling force of at least about 0.1625 Newtons per optical fiber for a thirty-meter length of fiber optic cable.

17. A method of making a tubeless fiber optic cable comprising:
   providing at least one optical fiber;
   providing a first strength member, the first strength member having a construction that includes a plurality of strands, wherein the first strength member has an essentially dead-lay;
   providing a second strength member, the second strength member having a construction that includes a plurality of strands, wherein the second strength member has an essentially dead-lay; and
   applying a cable jacket about the at least one optical fiber, the first strength member, and the second strength member, wherein the first strength member and the second strength member are disposed on opposite sides of a cavity of the cable jacket, thereby inhibiting the distortion of a cross-sectional shape of the cable jacket.

18. The method of claim 17, further including the step of elastically straining both the first strength member and the second strength member while applying the cable jacket.

19. The method of claim 17, wherein the at least one optical fiber has a coupling force of at least about 0.1625 Newtons per optical fiber for a thirty-meter length of fiber optic cable.

20. A tubeless fiber optic cable comprising:
   at least one optical fiber; and
   a cable jacket, the cable jacket providing a tubeless cable construction having a cross-sectional shape defining a cavity along a longitudinal axis of the fiber optic cable; and
   a first strength member and a second strength member having a construction that includes a plurality of strands, the first strength member and the second strength member being disposed on opposite sides of the cavity, wherein the first strength member has a torsional force in a first direction and the second strength has a torsional force in a second direction that is in the opposite of the first direction, thereby intentionally distorting a cross-sectional shape of the cavity due to torsional forces from the strength members being in opposite directions.

* * * * *